United States Patent
Klima et al.

(10) Patent No.: US 10,920,718 B2
(45) Date of Patent: Feb. 16, 2021

(54) TURBO COMPRESSOR

(71) Applicant: MAN ENERGY SOLUTIONS SE, Augsburg (DE)

(72) Inventors: Jiri Klima, Namest nad Oslavou (CZ); Ondrej Tomek, Námest nad Oslavou (CZ); Klaus Bartholomä, Friedberg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/359,523

(22) Filed: Mar. 20, 2019

(65) Prior Publication Data
US 2019/0338732 A1 Nov. 7, 2019

(30) Foreign Application Priority Data
Mar. 22, 2018 (DE) .................. 10 2018 106 900.6

(51) Int. Cl.
| | | |
|---|---|---|
| *F02M 26/09* | (2016.01) | |
| *F02M 26/04* | (2016.01) | |
| *F02D 23/00* | (2006.01) | |
| *F02D 23/02* | (2006.01) | |
| *F02B 37/04* | (2006.01) | |

(52) U.S. Cl.
CPC ............ *F02M 26/09* (2016.02); *F02D 23/005* (2013.01); *F02D 23/02* (2013.01); *F02M 26/04* (2016.02); *F02B 37/04* (2013.01); *F05D 2220/40* (2013.01)

(58) Field of Classification Search
CPC ........ F02M 26/04; F02M 26/09; F02M 26/34; F02D 23/005; F02D 23/02; F16J 15/002; F16J 15/16; F16J 15/44; F16J 15/447; F16J 15/441; F01D 11/00; F01D 11/003; F01D 25/183; F04D 29/08; F04D 29/083; F04D 29/10; F04D 29/102; F04D 29/12; F04D 29/122
See application file for complete search history.

(56) References Cited

U.S. PATENT DOCUMENTS

| | | | | |
|---|---|---|---|---|
| 6,925,992 | B1 * | 8/2005 | Eriksson | F16K 11/165 123/568.12 |
| 2015/0330240 | A1 * | 11/2015 | Kelly | F01D 11/001 415/1 |
| 2016/0160872 | A1 * | 6/2016 | Kelly | F01D 25/16 415/175 |

* cited by examiner

*Primary Examiner* — Jesse S Bogue
*Assistant Examiner* — Loren C Edwards
(74) *Attorney, Agent, or Firm* — Cozen O'Connor

(57) ABSTRACT

A turbo compressor of an exhaust gas recirculation of an internal combustion engine, with a compressor housing, a compressor rotor, a shaft that is coupled to the compressor rotor and mounted in the compressor housing, a piston ring seal to prevent an exhaust gas blow-by flow in the direction of bearings, and a labyrinth seal, which seen in the direction of the exhaust gas blow-by flow, is positioned upstream of the piston ring seal.

10 Claims, 1 Drawing Sheet

TURBO COMPRESSOR

BACKGROUND OF THE INVENTION

1. Field of the Invention

The invention relates to a turbo compressor.

2. Description of the Related Art

Internal combustion engines with exhaust gas recirculation are known to the person skilled in the art addressed here. Accordingly, exhaust gas is extracted from an exhaust system of the internal combustion engine via an exhaust gas recirculation system and fed to a charge air system of the internal combustion engine, in order to mix charge air to be fed to the cylinders of the internal combustion engine with exhaust gas. The exhaust gas is compressed via a turbo compressor and delivered in the direction of the charge air system.

FIG. 1 shows in the cross section an extract from a turbo compressor of an exhaust gas recirculation of an internal combustion engine known from the prior art, wherein in FIG. 1 a compressor housing 10 and a compressor rotor 11 that is rotatably mounted in the compressor housing 10 are shown by way of an extract. The compressor rotor 11 is coupled to a shaft 12 which is mounted in the compressor housing 10 by way of bearings, which are not shown. According to FIG. 1 it is already known from the prior art that between the shaft 12 and the compressor housing 10 a piston ring seal 13 is formed. By way of such a piston ring seal 13, an exhaust gas blow-by flow 14 emanating from the compressor rotor 11 in the direction of bearings, which are not shown, is at least partially prevented.

SUMMARY OF THE INVENTION

One aspect of the present invention is a new type of turbo compressor.

According to one aspect of the invention, a labyrinth seal, seen in the direction of the exhaust gas blow-by flow, is positioned upstream of the piston ring seal. Through the additional labyrinth seal, which is positioned in the direction of the exhaust gas blow-by flow upstream of the piston ring seal, the development of an exhaust gas blow-by flow can be more effectively prevented than is possible according to the prior art.

According to an advantageous further development, a sealing air bore is present, via which the sealing air can be directed in the direction of a gap formed between the piston ring seal and the labyrinth seal. By way of this, an even more effective prevention of the exhaust gas blow-by flow is possible.

According to an advantageous further development, the sealing air impinges on the labyrinth seal with a defined sealing air pressure and on the piston ring seal, wherein the sealing air pressure is greater than the exhaust gas pressure at the labyrinth seal. By way of this, the development of the exhaust gas blow-by flow can be particularly effectively counteracted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a turbo compressor of an exhaust gas recirculation of an internal combustion engine. The turbo compressor serves for extracting, compressing and delivering exhaust gas emanating from the exhaust gas system of an internal combustion engine in the direction of a charge air system of the same.

Figure 1:
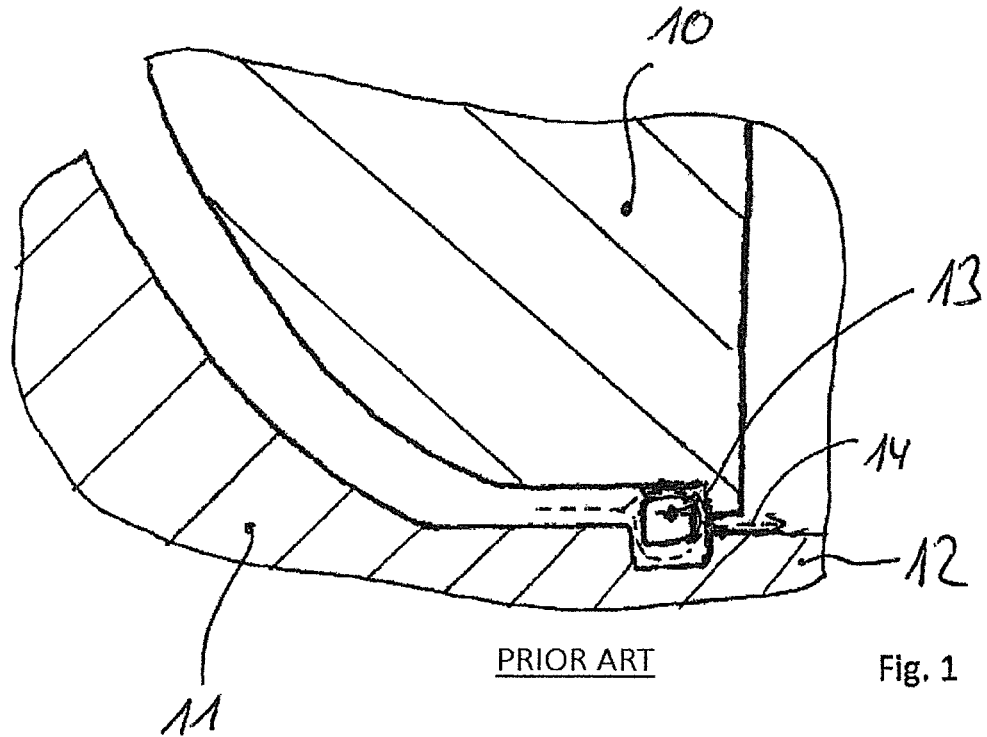
FIG. 1 is an axial section through a detail of a turbo compressor of an exhaust gas recirculation of an internal combustion engine according to the prior art.
Figure 2:
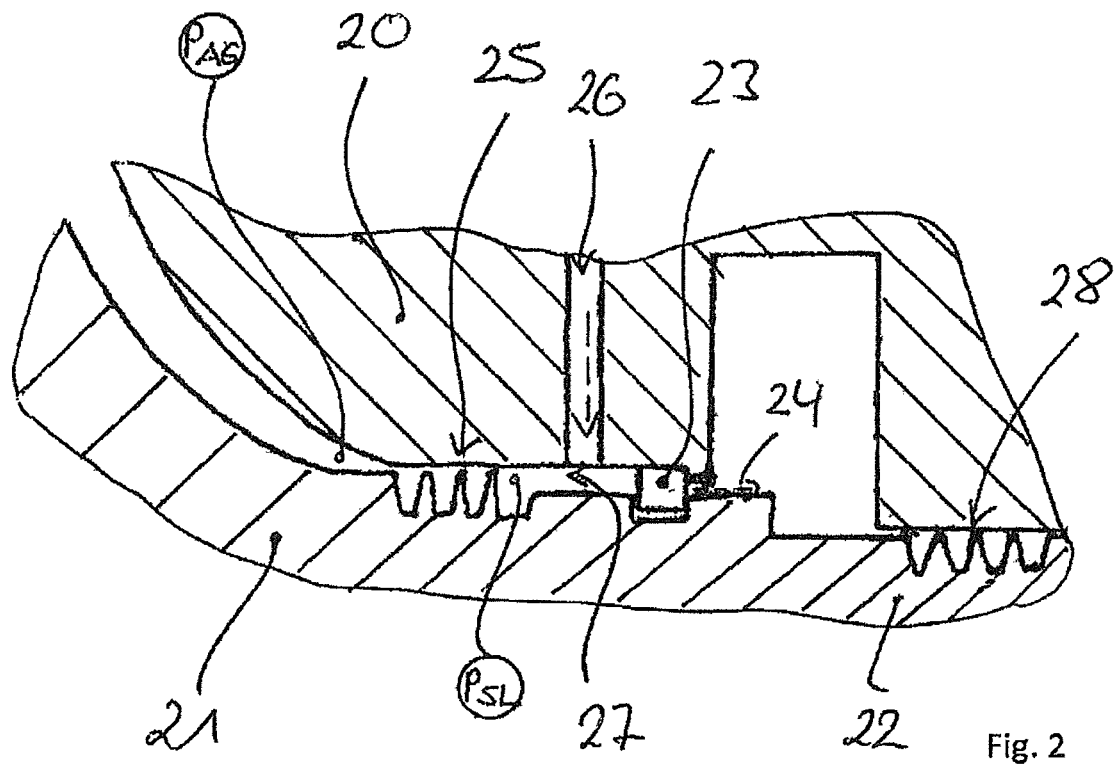
FIG. 2 is an axial section through a detail of a turbo compressor of an exhaust gas recirculation of an internal combustion engine.

FIG. 2 shows an extract from a turbo compressor according to the invention in the region of a compressor housing 20 of the compressor rotor 21 and of a shaft 22, which is connected to the compressor rotor 21 and mounted in the compressor housing 20 by way of bearings, which are not shown.

As is already customary in the prior art, a piston ring seal 23 is formed between the shaft 22 and the compressor housing 20, which serves to counteract the development of an exhaust gas blow-by flow in the direction of the bearings, which are not shown.

According to the present invention, a labyrinth seal 25 is additionally formed preferentially between the compressor rotor 21 and the compressor housing 20 of the turbo compressor of the exhaust gas recirculation. The labyrinth seal 25 can also be formed between the shaft 22 and the compressor housing 20. Seen in the direction of the exhaust gas blow-by flow, this labyrinth seal 25 is positioned upstream of the piston ring seal 23. Thus, before exhaust gas flows in the direction of the piston ring seal it has to first overcome the labyrinth seal 25.

Preferentially, a sealing air bore 26 is formed, via which sealing air can be fed to a gap 27 between the piston ring seal 23 and the labyrinth seal 25. A sealing air pressure $p_{SL}$ is present in this gap 27 between the labyrinth seal 25 and the piston ring seal 23. The sealing air impinges with this sealing air pressure $p_{SL}$ on the labyrinth seal 25 and the piston ring seal 23.

The sealing air pressure $p_{SL}$ is greater than the exhaust gas pressure $p_{AG}$ that is present at the labyrinth seal 25 on a side located opposite the gap 27. Accordingly, the sealing air prevents an exhaust gas flow via the labyrinth seal 25. At most, a blow-by flow 24 of sealing air flows via the piston ring seal 23.

Accordingly, the labyrinth seal 25 is present in the turbo compressor of an exhaust gas recirculation according to the invention in addition to the piston ring seal 23. Between these two seals, i.e. between the piston ring seal 23 and the labyrinth seal 25, which seen in the flow direction of an exhaust gas blow-by flow is positioned upstream of the piston ring seal 23, sealing air can be conducted, namely via the sealing air bore 26. Thus, exhaust gas being directed towards the bearings of the shaft 22 can be effectively prevented.

According to FIG. 2, a further labyrinth seal 28 between the shaft 22 and the compressor housing 20 is formed downstream of the piston ring seal 23. This serves to prevent that the sealing air is directed towards the bearings of the shaft 22 and thus being introduced into lubricating oil for the bearings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbo compressor of an exhaust gas recirculation of an internal combustion engine, comprising:
    a compressor housing;
    a compressor rotor;
    a shaft that is coupled to the compressor rotor mounted in the compressor housing;
    a piston ring seal configured to prevent an exhaust gas blow-by flow in a downstream direction;
    a first labyrinth seal that extends axially is positioned upstream of the piston ring seal in the direction of the exhaust gas blow-by flow;
    a second labyrinth seal that extends axially is positioned downstream of the piston ring seal configured to prevent a sealing air from being introduced into a lubricating oil; and
    a sealing air bore, via which the sealing air is directed towards a gap formed between the piston ring seal and the first labyrinth seal.

2. The turbo compressor according to claim 1, wherein the sealing air having a defined sealing air pressure impinges on both the first labyrinth seal and the piston ring seal.

3. The turbo compressor according to claim 2, wherein the defined sealing air pressure is greater than an exhaust gas pressure at the first labyrinth seal.

4. The turbo compressor according to claim 3, wherein the defined sealing air pressure is greater than the exhaust gas pressure at the first labyrinth seal by at least one of 5% to 15% and 8% to 12%.

5. The turbo compressor according to claim 4, wherein the piston ring seal is formed between one of:
    the compressor housing and the compressor rotor and
    the compressor housing and the shaft.

6. The turbo compressor according to claim 5, wherein the first labyrinth seal is formed between one of:
    the compressor housing and the compressor rotor, and
    the compressor housing and the shaft.

7. The turbo compressor according to claim 1, wherein the piston ring seal is formed between one of:
    the compressor housing and the compressor rotor and
    the compressor housing and the shaft.

8. The turbo compressor according to claim 1, wherein the first labyrinth seal is formed between one of:
    the compressor housing and the compressor rotor, and
    the compressor housing and the shaft.

9. The turbo compressor according to claim 1, wherein the first labyrinth seal is formed between the compressor housing and the compressor rotor.

10. The turbo compressor according to claim 1, wherein the sealing air bore extends substantially radially and the first labyrinth seal and the second labyrinth seal 28 are substantially perpendicular to the sealing air bore.

\* \* \* \* \*